G. B. EGGERT.
APPARATUS FOR HANDLING BREAD.
APPLICATION FILED NOV. 30, 1921.
1,427,679.
Patented Aug. 29, 1922.
3 SHEETS—SHEET 1.
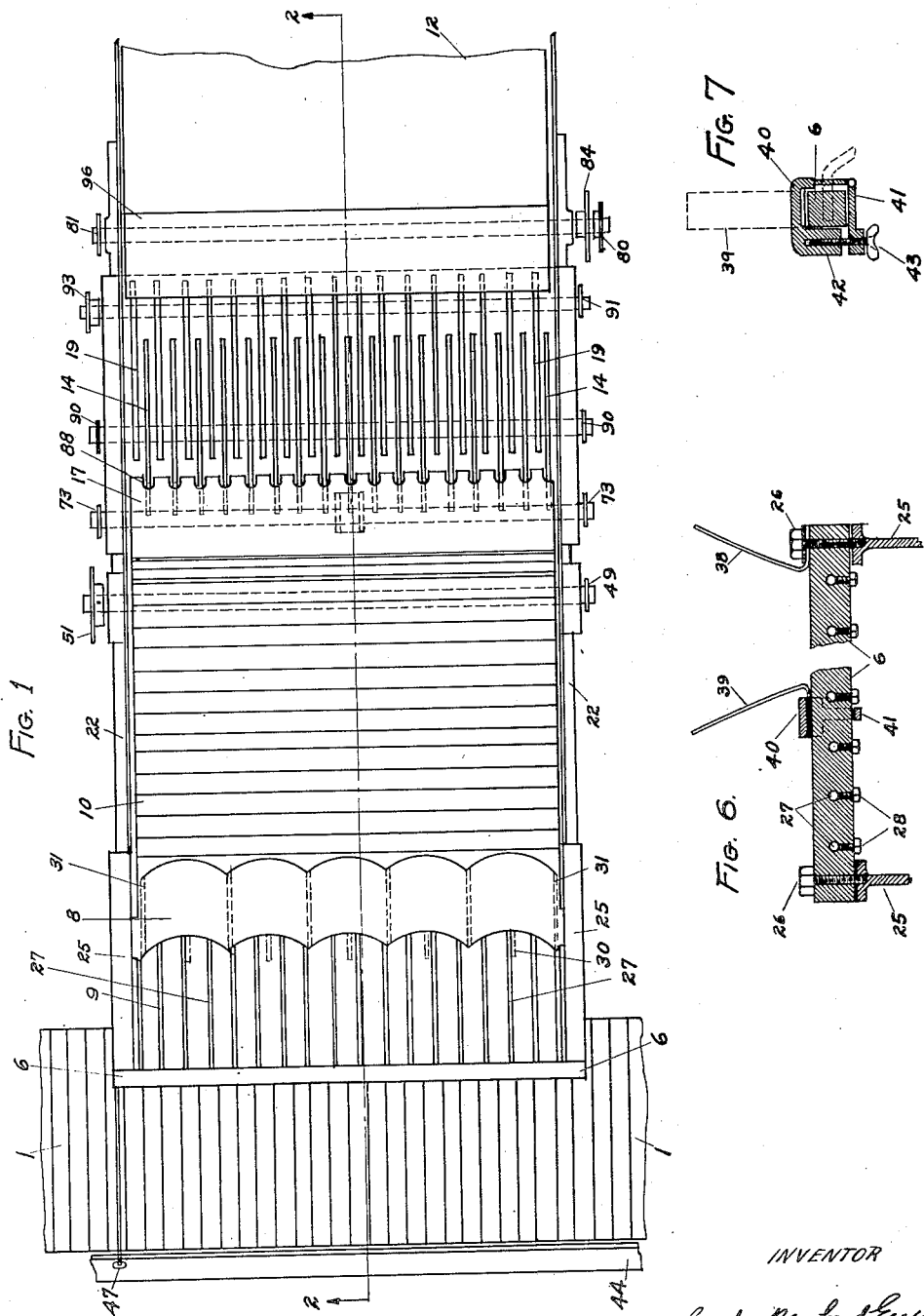
INVENTOR
Gustav Bernhard Eggert

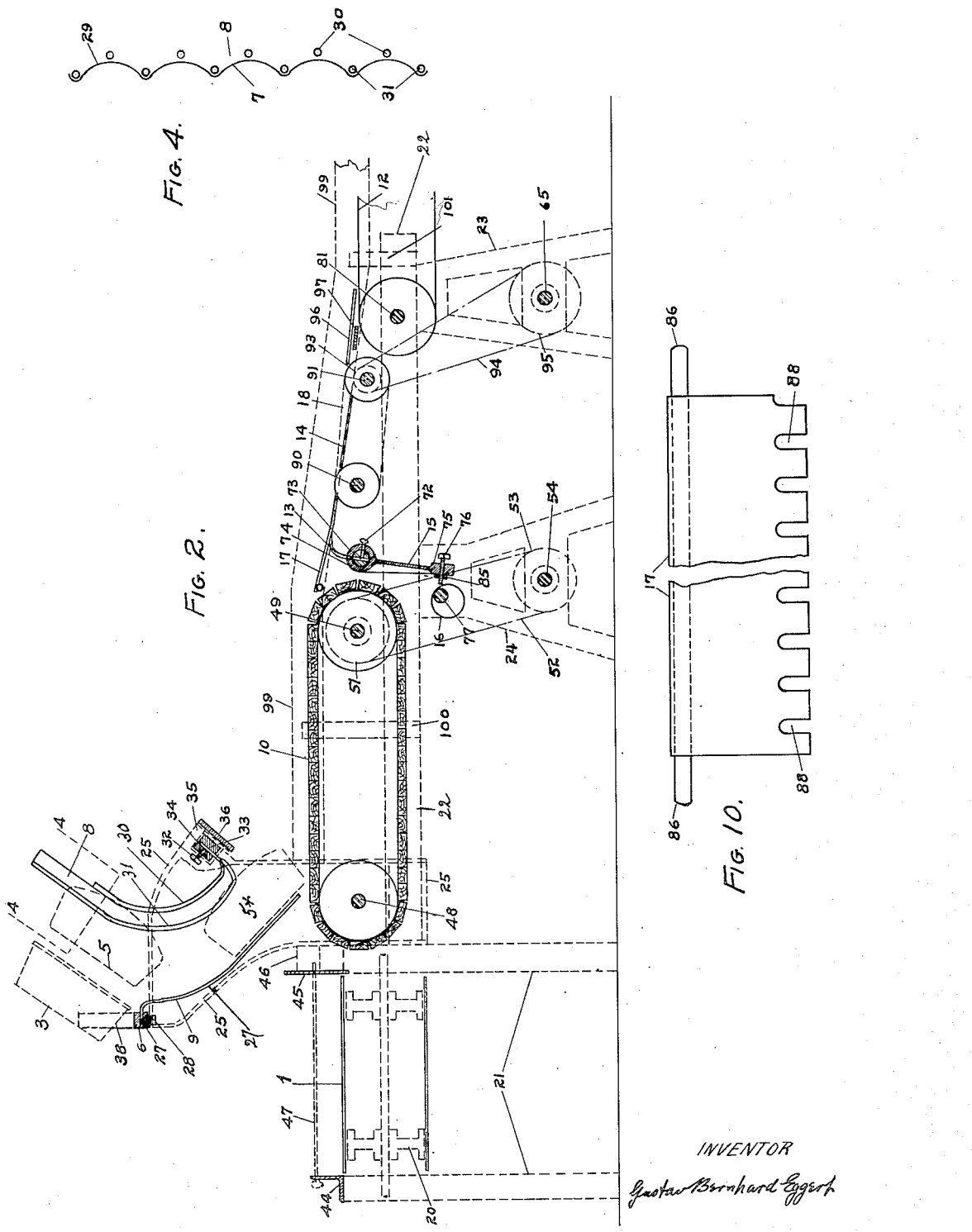

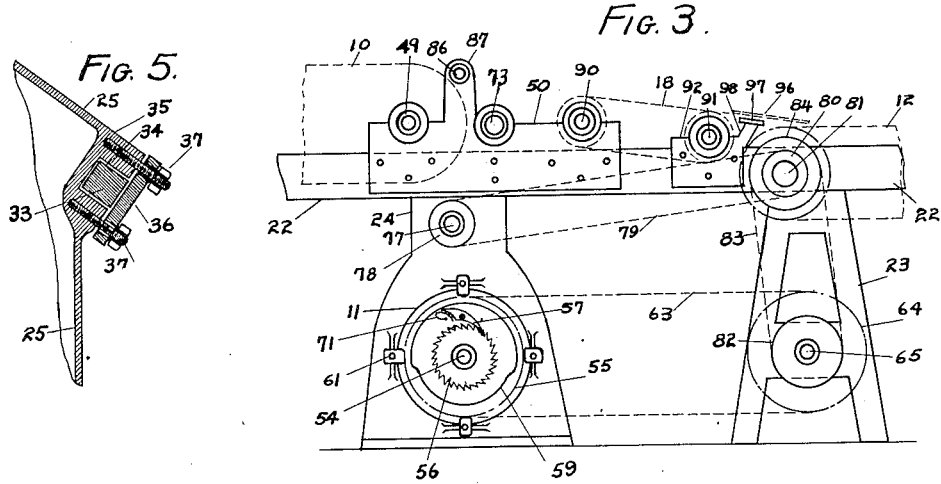

UNITED STATES PATENT OFFICE.

GUSTAV BERNHARD EGGERT, OF SAGINAW, MICHIGAN, ASSIGNOR TO BAKER-PERKINS MANUFACTURING CORPORATION, OF SAGINAW, MICHIGAN, A CORPORATION OF NEW YORK.

APPARATUS FOR HANDLING BREAD.

1,427,679.         Specification of Letters Patent.     Patented Aug. 29, 1922.

Application filed November 30, 1921. Serial No. 518,876.

*To all whom it may concern:*

Be it known that I, GUSTAV BERNHARD EGGERT, a citizen of the United States, residing at Saginaw, in the county of Saginaw and State of Michigan, have invented new and useful Improvements in Apparatus for Handling Bread, of which the following is a specification.

My invention relates to the arrangement and transportation of the baked loaves coming hot from the oven to the conveyer or similar contrivance on which they are cooled and taken to the store room, and has for its object to perform the necessary operations automatically and without touching the loaves by hand, thus obtaining a great sanitary advantage, saving a considerable amount of labour and increasing the efficiency of the cooling conveyer or similar device used, (hereinafter called in general "cooling conveyer").

To this end, my invention consists of an apparatus for automatically righting the loaves tipped from their pans, (that is: putting their flat bottoms downwards and round up upwards), of an allineating device for arranging the loaves in rows side by side, and of a timing device for delivering the rows of loaves at regular intervals to the cooling conveyer or the like. I preferably use for righting the loaves the apparatus described in my application for Letters Patent executed at the same date as the present application, June 28th 1921, as allineating device an intermittent conveyer, and as timing device a rocking grate receiving the rows of loaves at regular intervals from the intermittent conveyer over a swinging chute bridging the interstice between the latter and the former, and transferring them to the cooling conveyer or the like by means of a quickly working chain conveyer.

The righting device mentioned is composed, as used for this purpose, of a straight bar,—the "canting bar,"—arranged opposite to the attendant above and alongside the platform receiving the pans containing the loaves hot from the oven and serving to separate the loaves from their pans by canting them over thereon, of an inclined baffle provided with channels adapted to receive the tops of the loaves dropping from the pans, and of an inclined chute pointing in opposite direction to the inclination of the baffle and arranged underneath the latter and the bar in such a manner and at such a distance that the loaves, sliding down in the channels on their tops side by side through the space between the bar and the baffle, hit the chute with the edge of their bottom and are thereby righted. This chute ends a short distance above the intermittent conveyer which during its active period draws away the loaves gathered on the same at the lower end of the chute, and is worked by any suitable device capable of being regulated in regard to the length of the active and inactive periods of the conveyer. The rocking grate comprises a platform consisting of parallel fingers, fixed on a rotatable shaft and arranged so as to be able, to receive the loaves from the intermittent conveyer and to slip on the downward stroke of the grate between the chains of the chain conveyer mentioned above, a lever rigidly connected to the same shaft, and an eccentric or some similar device reciprocating the lever and adapted to be regulated in regard to the length of the oscillations effected. The intermittent conveyer as well as the rocking grate must be worked according to requirements in unison with the cooling conveyer or the like and are therefore preferably driven from the driving shaft of the latter directly or through intermediate gearings. The chute, facilitating the passage of the loaves from the intermittent conveyer to the rocking grate, has a swinging motion and is formed by a plate provided at one end with slots for the fingers of the rocking grate and rotatably mounted at the opposite end, so as to be able to follow the movements of the latter.

The novel features, arrangements, parts and combinations thereof, which constitute this invention, are fully explained in the following description of an example of its application which is also represented in the accompanying drawings.

Fig. 1 is a top view of the apparatus.

Fig. 2 represents a vertical section of the same on line 2—2, showing in dotted lines the moving gear situated at the left side of the apparatus.

Fig. 3 shows a side view of the moving gear situated at the right side of the apparatus, including the intermittent device preferably used.

Fig. 4 represents a cross section of the baffle on line 4—4.

Fig. 5 is a cross section through the bar carrying the baffle and its supports.

Fig. 6 is a vertical section in broken length of the canting bar, and Fig. 7 a cross section of the same.

Fig. 8 represents a vertical section through the centerline of the intermittent device shown in Fig. 3, and Fig. 9 shows details, (the two cam rings for adjusting the periods of the intermittent conveyer,) used in this device.

Fig. 10 is a plan of a portion of the swinging chute, showing the slots for the fingers of the rocking grate.

Fig. 11 represents a vertical section of a portion of the shaft of the rocking grate showing the arrangement thereon of the fingers forming its platform, and of the rocking lever, and Fig. 12 shows a similar section of the shaft of the chain conveyer, and of the sprockets mounted thereon for driving its chains.

Like numerals of reference indicate corresponding parts serving the same or similar purpose.

In the drawings 1 indicates a steel slat conveyer bringing the baked bread from the oven to the apparatus for handling the same and serving as platform from which the attendant lifts the pans 3 containing the loaves 5 and cants them over on the canting bar 6 into the position shown in dotted lines, striking, if necessary, the pans slightly against the bar in order to loosen from their walls the crust of the loaves apt to adhere thereto. After thus the loaves 5, which are generally contained in pans combined to nests by being fastened together at their longer sides, have been separated from the pans 3, they drop with their top into the channels 7 of the inclined baffle 8 filling the same, and slide then by their own gravity downwards onto the curved chute 9 pointing in the opposite direction to the inclination of the baffle 8. The loaves 5, kept bottom upwards by the sidewalls of the channels 7, touch the chute 9 first with the lower edge of their bottom and slip then down the same, top now upwards, until they reach the position 5* on the intermittent conveyer 10. The latter is worked intermittently by means of the device 11, which obviates the unavoidable small irregularities in the supply and the travelling down the baffle 8 and the chute 9 of the loaves. During the interval in which the conveyer 10 does not work, the loaves will gather on the same in an inclined position in the lower part of the chute 9 side by side, and, as soon as the conveyer starts to move, they are drawn forward duly righted, that is: top upwards, and allineated, that is: side by side in a straight line across the conveyer. It will now happen that several loaves or rows of loaves collect one above the other in the chute 9 so that during its active period the conveyer 10 draws them forward closely following each other. In order to separate these consecutive rows and to deliver them to their destination, the cooling conveyer 12, at a regular distance from each other and at regular intervals of time, I preferably use a timing device the main part of which consists of the rocking grate 13 formed by the fingers 14 and worked by the lever 15 and the eccentric 16; the swinging chute 17 serves to bridge the interstice between the conveyer 10 and the rocking grate 13 and facilitates the passage of the loaves from the former to the latter, while the quickly moving chain conveyer 18 transfers the loaves at once from the rocking grate 13, the fingers 14 of which oscillate between and above its chains 19, to the cooling conveyer 12. The rocking grate 13 is so constructed and arranged that only one loaf or one row of loaves is transmitted by the same during one revolution of its eccentric 16.

The conveyer 1 is worked by the moving gear 20 and supported by the framework 21. (Both the gear 20 and the framework 21, as all other necessary supports used in the apparatus, are shown in Fig. 2 in dotted line). The beams 22, on which the intermittent conveyer 10, the rocking grate 13, the swinging plate 17, the chain conveyer 18 and the one end shown of the cooling conveyer 12 are mounted, are carried at one end by the framework 11, at their opposite end by the standards 23 and in their middle part by the standards 24. The upright supports 25 which carry the canting bar 6, the baffle 8 and the chute 9, are securely bolted to the beams 22 and so constructed that they serve as side walls of the chute 9, whereby the loaves sliding down the same are prevented from slipping over its side edges. The canting bar 6, a stout square rod of steel, is rigidly fastened to the top of the supports 25 by the screws 26 and carries the chute 9. The latter is composed of a number of parallel round curved rods 27 secured in corresponding holes provided in the canting bar 6 by means of the screws 28 and forming combined a curved plane parallel to 6, but pointing downwards opposite to the inclination of the baffle 8 and towards the conveyer 10. The baffle 8 consists of the corrugated iron plate 29, the grooves of which form the channels 7 mentioned above, and is carried at the bottom of these grooves by the rods 30 and at the ridges, in which they meet, by the rods 31. The rods 30 and 31 are parallel to each other and curved downwards underneath the plate 29, the rods 31 following in outline the curve of the chute 9 and serving as side guides for the upper part of the loaves sliding down the same. Both the rods 30 and 31 are securely fixed by means of the screws 32 in corresponding holes provided in the stout square bar 33, which, thus carrrying the baffle 8, fits in corresponding recesses 34 in the reenforced parts 35 of the supports 25 and is rigidly held therein by means of the plate 36 screwed onto the parts 35 by the bolts 37. By unscrewing the latter the plate 36 and thereby the bar 32 with the whole baffle 8 can be quickly removed and the latter exchanged for another one having different channels suitable for loaves of a different size. In order to place the pan-nests always into their proper position in regard to the channels 7 of the baffle 8, two guides 38 and 39 consisting of strong band iron and slightly curved outwards are preferably employed. The guide 38 is stationary and fixed to the canting bar 6 by the same screw 26 which fastens the bar to the support 25. The position of the guide 39 can be changed in order to conform with the width of the pan-nests used; it is fastened to the canting bar 6 by means of the clamp 40, the hinged narrower part 41 of which is locked to the thicker backpart 42 by means of the thumb screw 43. The angle iron 44 fixed to the top of the framework 21 and the plate 45 carried by the supports 25 by means of the brackets 46 are intended to prevent any pans from slipping over the edges of the conveyer 1, and the rod 47, stretching across the latter and resting in suitable openings provided in the uprights of the angle iron 44 and in the plate 45, stops the pans containing loaves from travelling beyond the working place underneath the canting bar 6 of the attendant. The latter, after having emptied the pans, will place them on the conveyer 1 on the other side of the rod 47, whereupon they will be carried to their destination, usually a pan cleaning and greasing machine.

The intermittent conveyer 10, which is preferably made of wooden slats, is built on and revolves with the shafts 48 and 49. The shaft 48 rotates in bearings provided in the supports 25, and the shaft 49 is revolved in bearings, contained in the brackets 50 bolted to the beams 22, by means of the sprocket wheel 51 mounted thereon (shown in Fig. 2 as on the left side of the apparatus), of the endless chain 52 and of the sprocket wheel 53 fixed to the counter shaft 54, carrying on its opposite end the device 11 and mounted in bearings provided in the standards 24. The intermittent device 11 is composed of the sprocket wheel 55 loosely revolving on the shaft 54, of the ratchet wheel 56 rigidly mounted in front of the loose wheel 55 on the same shaft, of the two-armed pawl 57, turning round the pin 58 fixed sidewise to a spoke of the loose wheel 55 and so arranged as to catch with the end of one arm in the teeth of the ratchet wheel 56 when in the proper position therefor, and of the two cam rings 59 and 60, along the inner rims of which the end of the other arm of the pawl 57 slides. The cam rings 59 and 60 are fastened one upon the other and concentrically with the shaft 54 by means of the clamps 61 in the closely fitting brackets 62 forming one piece with or attached to the standard 24. The loose wheel 55 is continuously rotated by means of the endless chain 63 and the sprocket wheel 64 fixed on the driving shaft 65 revolubly mounted in bearings provided in the standards 23. Both rings 59 and 60 are circular in circumference and have the same outer diameter and the same cams, which latter are formed in each by the surface of their inner rims being divided into a larger section 66, having for both the same longer radius 67, and a smaller section 68, having for both the same shorter radius 69, the two different sections being connected by inclined surfaces 70 on which the pawl 57 can slip easily from one section to the other one. One end of the pawl 57 is of sufficient breadth to cover the cams of the two rings 59 and 60 combined and pressed against these cams by the spring 71. The shape and size of the pawl 57 are such, and the pin 58 is fixed to the sprocket wheel 55 at such a point, that, as long as that end of the pawl 57 which is pressed against the cams, travels along their sections 66— farther away from the center of rotation,— its opposite end keeps locked in the ratchet wheel 56, whereby, in consequence of the latter being thus connected to and revolving with the sprocket wheel 55, the shaft 54 and the sprocket wheel 53 thereon are rotated, and thus the intermittent conveyer 10 is worked, and that, while the first named end of the pawl slides along the sections 68 of the cams—nearer to the center of rotation,— its opposite end is disengaged from the ratchet wheel 56, whereupon the latter stops rotating, and thus the conveyer cannot move. The duration of this inactive period of the conveyer 10 can be easily and quickly regulated by unscrewing the clamps 61 and turning the rings 59 and 60 one upon the other so that the sections 68 of their cams more or less cover each other in accordance with requirements. In Fig. 3 the sections 68 of the two cams are shown as covering each other completely, in which case the inactive period of the conveyer 10 is the shortest possible, while in Fig. 9 the section 68 of the cam ring 60 protrudes over that of the cam ring 59 and thus prolongs the way which the pawl has to travel on its surface, and thereby the inactive interval of the conveyer 10 in the same proportion.

The rods forming the fingers 14 of the rocking grate are bent near one end at about a right angle, and fastened with their shorter branches by means of the screws 72 in holes provided in the shaft 73 rotatably mounted in bearings contained in the brackets 50. The lever 15 is fixed to the shaft 73 by means of its annular top part 74 fitting over the same and provided with two openings, one for the shorter end of a finger 14 to slip through into its hole in the shaft 73, and the other one for a somewhat longer screw 72 which rigidly holds both, the fingers 14 and the lever 15, in position. The lower end of the latter consists of the ring 75 arranged in a plane vertical to the top part 74 and screw-threaded at its inner surface for receiving the bolt 76, the tip of which is pressed against the rim of the eccentric 16 by the gravity of the longer parts of the fingers 14 forming the platform of the grate. The eccentric 16 is rigidly mounted on the shaft 77 running in bearings contained in the standards 24 and rotated by means of the sprocket wheel 78 fixed to the same shaft, of the endless chain 79 and of the sprocket wheel 80 mounted on the shaft 81 working the cooling conveyer 12. The sprocket wheel 82 fixed to the driving shaft 65 revolves the shaft 81 and thereby the conveyer 12 built thereon and the eccentric 16 through the gearing mentioned by means of the endless chain 83 and the sprocket wheel 84 mounted on the shaft 81. By simply turning the screw bolt 76, the size of the oscillations of the lever 15 and thereby of the grate 13 itself can be regulated. The screw nut 85 serves for firmly retaining the bolt 76 in its position in the ring 75, when once determined according to requirements.

The swinging chute 17, which bridges the interstice between the intermittent conveyer 10 and the rocking grate 13 and follows the movements of the latter, is attached at one end to the rod 86, turning in corresponding bearings contained in the projections 87 of the brackets 50, and is provided at its other end with the slots 88, which are of such a width and so arranged that the fingers 14 easily slip into them, when the chute 17 and the platform of the rocking grate 13 are not in the same plane.

The endless chains 19 of the conveyer 18 run over the sprocket wheels 89, one half of the number of which is rigidly mounted on the shaft 90 rotating in bearings contained in the brackets 50, the other half being fixed to the shaft 91 revolved in bearings contained in the brackets 92. The shaft 91 is driven by means of the sprocket wheel 93 attached thereto, of the endless chain 94 and of the sprocket wheel 95 rigidly mounted on the driving shaft 65. The sprocket wheels 89 are so constructed and arranged that the fingers 14 are able in their downward stroke to move between the same, as shown in Fig. 12.

In order to facilitate the passage of the loaves from the chain conveyer 18 to the cooling conveyer 12, I preferably arrange between the same a small chute consisting of the inclined plate 96 carried by the bar 97 mounted on the projections 98 of the brackets 92. Guide boards 99, carried by brackets 100 and 101 fixed to the beams 22, are usually arranged along each side of the intermittent conveyer 10, the swinging chute 17, the rocking grate 13, the chain conveyer 18 and the cooling conveyer 12.

The example herein described and represented in the drawings is an apparatus which I preferably construct for large commercial bakeries using travelling baking ovens or a considerable number of ordinary ovens; but, while I thus illustrate my invention, it must be clearly understood that I in no wise limit the same to the one construction and form shown, as it will be evident to those skilled in the art that other apparatus may be designed which, though differing in shape and many details and their arrangement, yet contain the essential constructional parts necessary for carrying out my invention as clearly defined in the following claims.

I claim:

1. An apparatus for handling bread, comprising a device for automatically righting the loaves as soon as they have been tipped from their pans, means for automatically allineating the righted loaves, and a cooling conveyer carrying the righted and allineated loaves to the store room.

2. An apparatus for handling bread, comprising a device for automatically righting the loaves as soon as they have been tipped from their pans, means for automatically allineating the righted loaves, a cooling conveyer carrying the loaves to the storeroom, and means for transferring the righted and allineated loaves from the said allineating means to the said conveyer at regular intervals.

3. In an apparatus of the kind described, in combination a device for automatically righting the loaves tipped from their pans, a chute down which the righted loaves slide, an intermittent conveyor drawing at intervals the loaves away from the said chute so as to allineate them, a device for working the said conveyor intermittently, a cooling conveyor carrying the loaves from the said intermittent conveyor to the store room, and a main driving shaft working through gearings the cooling conveyer as well as the said intermittent device.

4. In an apparatus of the kind described, in combination a device for automatically righting the loaves tipped from their pans, a chute down which the righted loaves slide, an intermittent conveyor drawing at intervals the loaves away from the chute, a device for working the said conveyer intermittently, means for regulating the proportion of the length of the active to that of the inactive period of the said intermittent conveyer, a cooling conveyer carrying the loaves from the latter to the storeroom, and a main driving shaft working through gearings the said cooling conveyor as well as the said intermittent device.

5. In an apparatus of the kind described, in combination a device for automatically righting the loaves tipped from their pans, a chute down which the righted loaves slide, a conveyer placed underneath the said chute so as to carry away the loaves, a main driving shaft, a counter shaft, gearing working the said conveyer from the said counter shaft, a wheel mounted loosely on the latter, gearing revolving the said loose wheel from the said main driving shaft, and means for intermittently connecting the said loose wheel to the said counter shaft and thus intermittently working the said conveyer.

6. In an apparatus of the kind described, in combination a device for automatically righting the loaves tipped from their pans, a chute down which the righted loaves slide, a conveyer placed underneath the said chute so as to carry away the loaves, a main driving shaft, a counter shaft, gearing working the said conveyer from the said counter shaft, a wheel mounted loosely on the latter, gearing revolving the said loose wheel from the said main driving shaft, a ratchet wheel rigidly mounted on the said counter shaft alongside the said loose wheel, a stationary cam ring surrounding the said ratchet wheel, the cam of the said cam ring being formed by the inner rim of the latter and consisting of two sections, one nearer to and the second one farther away from the said ratchet wheel, the two sections being connected by short inclines, a pin fixed sidewise to the said loose wheel so as to rotate with the latter within the space between the said cam ring and the said ratchet wheel, and a two-armed pawl turning round the said pin, the end of one arm of the said pawl being shaped to slide smoothly along the said cam, against which it is pressed by a spring, and the opposite arm being so arranged as to catch in the said ratchet wheel when the first named arm travels along that section of the said cam farthest away from the said ratchet wheel.

7. In an apparatus of the kind described, in combination a device for automatically righting the loaves tipped from their pans, a chute down which the righted loaves slide, a conveyer placed underneath the said chute so as to carry away the loaves, a main driving shaft, a counter shaft, supports for the same, gearing working the said conveyer from the said counter shaft, a wheel mounted loosely on the latter, gearing revolving the said loose wheel from the said main driving shaft, a ratchet wheel rigidly mounted on the said counter shaft alongside the said loose wheel, two circular cam rings their outer rims having the same diameter and their inner rims, forming the cams, having at all points radii longer than that of the said ratchet wheel, each cam consisting of two sections, one nearer to and the second one farther away from the circumference of the outer rims of the said rings, the two sections being connected by short inclines, brackets arranged at the said supports so as to hold the said two cam rings, placed one upon the other, concentrically surrounding the said ratchet wheel, screw clamps locking the said cam rings, regulated in regard to their position towards each other, in the said brackets, a pin fixed sidewise to the said loose wheel so as to rotate with the latter within the space between the said ratchet wheel and the said two cam rings, and a two-armed pawl turning round the said pin, the end of one arm of the said pawl being broad enough to cover the cams of the said two cam rings placed side by side and shaped to slide smoothly along the said cams against which it is pressed by a spring, and the opposite arm being so arranged as to catch in the said ratchet wheel, when the first named arm travels along those sections of the said cams nearer to the circumference of the outer rims of the said cam rings.

8. In an apparatus of the kind described, in combination a device for automatically righting the loaves tipped from their pans, a chute down which the righted loaves slide, an intermittent conveyer drawing the loaves away from the said chute so as to allineate them, a device for working the said conveyer intermittently, a cooling conveyer, a rocking grate interposed between the said cooling conveyer and the said intermittent conveyer and adapted to time the delivery of the loaves allineated by the latter to the former, means for oscillating the said rocking grate, and a main driving shaft working through gearings the said cooling conveyer, the said intermittent device and the said oscillating means.

9. In an apparatus of the kind described, in combination a device for automatically righting the loaves tipped from their pans, a chute down which the righted loaves slide, an intermittent conveyer drawing the loaves away from the said chute, thus allineating them, a device for working the said conveyer intermittently, a cooling conveyer, a rocking grate interposed between the said cooling conveyer and the said intermittent conveyer and adapted to time the delivery of the loaves allineated by the latter to the former, means for oscillating the said rocking grate, means for regulating the length of the oscillations of the latter, and a main driving shaft working through gearings the said cooling conveyer, the said intermittent device and the said oscillating means.

10. In an apparatus of the kind described, in combination a device for automatically righting the loaves tipped from their pans, a chute down which the righted loaves slide, an intermittent conveyer drawing the loaves away from the said chute, thus allineating them, a cooling conveyer, a rocking grate adapted to time the delivery of the loaves allineated by the said intermittent conveyer to the said cooling conveyer, a swinging chute bridging the interstice between the said intermittent conveyer and the said rocking grate and following the movements of the latter, and a rapidly moving conveyer transferring the loaves from the said rocking grate to the said cooling conveyer.

11. In an apparatus of the kind described, in combination a device for automatically righting the loaves tipped from their pans, a chute down which the righted loaves slide, an intermittent conveyer drawing the loaves away from the said chute, thus allineating them, a cooling conveyer, a rocking grate adapted to time the delivery of the loaves to the latter from the said intermittent conveyer, parallel fingers forming the platform of the said rocking grate and pointing away from the said intermittent conveyer in the direction of its movement, a rotatable shaft in which the said fingers are fixed, a lever rigidly connected to the said shaft, means for reciprocating the said lever, two rotable shafts situated parallel to the above named shaft and between the latter and the said cooling conveyer, sprocket wheels of equal size, fixed in equal number to each of the said two shafts, endless chains running over the said sprocket wheels and forming a conveyer, the shape and number of the sprocket wheels being such, and the interstices between the said chains being of such a width that on the downward stroke of the said rocking grate its fingers dip down between the said chains, and means for rapidly moving the conveyer formed by the latter in the direction of the said cooling conveyer.

12. In an apparatus of the kind described, in combination a device for automatically righting the loaves tipped from their pans, a chute down which the righted loaves slide, an intermittent conveyer drawing the loaves away from the said chute, thus allineating them, a rocking grate adapted to receive the loaves from the said intermittent conveyer, a rotatable shaft on which the platform of the said grate is fixed, a lever connected with one end to the said rotatable shaft, the axis of the latter forming the fulcrum of the said lever, a shaft revolving in stationary bearings, and an eccentric rigidly mounted on the same, the said eccentric and its said shaft being so arranged that the free end of the said lever is pressed against the rim of the said eccentric by the weight of the said grate which is thus rocked by the revolutions of the latter.

13. In an apparatus of the kind described, in combination a device for automatically righting the loaves tipped from their pans, a chute down which the righted loaves slide, an intermittent conveyer drawing the loaves away from the said chute, thus allineating them, a rocking grate adapted to receive the loaves from the said intermittent conveyer, a rotatable shaft on which the platform of the said grate is fixed, a lever connected with one end to the said rotatable shaft, the axis of the latter forming the fulcrum of the said lever, a screw threaded opening provided in the opposite end of the said lever vertically to the axis of the said rotatable shaft, a screw bolt meshing with this screw threaded opening, a shaft revolving in stationary bearings, and an eccentric rigidly mounted on the same, the said eccentric and its said shaft being so arranged that the tip of the said screw bolt is pressed against the rim of the said eccentric by the weight of the said grate which is thus rocked by the revolution of the latter, the length of its oscillations being regulated by turning the said screw bolt.

14. In an apparatus of the kind described, in combination a device for automatically righting the loaves tipped from their pans, a chute down which the righted loaves slide, an intermittent conveyer drawing the loaves away from the said chute, a rocking grate adapted to receive the loaves from the said intermittent conveyer, parallel fingers forming the platform of the said rocking grate and pointing in the direction of the movement of the said intermittent conveyer, a chute bridging the interstice between the latter and the said rocking grate and consisting of a plain plate, a rotatable rod fixed to that end of the said chute nearest to the said intermittent conveyer, and slots cut in the opposite end of the said chute, equal in number to that of the said fingers, and being of such a width and so arranged that the said fingers easily slip into them, when the said chute and the platform of the said rocking grate are not in the same plane.

15. An apparatus for handling bread, consisting of a platform receiving the hot baked loaves contained in their pans, a canting bar arranged at a suitable distance above and alongside the said platform for canting over thereon the pans containing the loaves, a baffle placed opposite and parallel to the said canting bar and at such an inclination towards and such a distance from the latter that the loaves, tipped on the said bar out of their pans, drop with their tops onto the said baffle and, sliding down the same, pass easily through the open space between the said baffle and the said canting bar, an inclined chute pointing in opposite direction to the said baffle and arranged underneath the latter in such a manner and at such a distance therefrom that the loaves coming from the same strike the upper part of the said chute with the edge of their bottom and then slide down the latter top upwards, an intermittent conveyer situated underneath the said chute and adapted to remove during its active period the righted loaves gathered during its inactive period in a line at the lower end of the said chute, a cooling conveyer, and means for transferring the righted and allineated loaves from the said intermittent conveyer to the said cooling conveyer at regular intervals.

16. An apparatus for handling bread, consisting of a conveyer bringing the hot baked loaves contained in their pans from the oven, a canting bar arranged at a suitable distance above and alongside the said platform for canting over thereon the pans containing the loaves, an inclined baffle provided with channels corresponding in cross section to that of the loaves to be righted and arranged opposite to and at such a distance from the said bar that the separated loaves drop with their tops into the channels of the said baffle, and, sliding down the same side by side, pass easily through the open space between the said baffle and the said canting bar, an inclined chute pointing in opposite direction to the said baffle and arranged in regard to the latter and the said canting bar in such a manner and at such a distance therefrom that the loaves coming down from the said baffle strike the said chute with the edge of their bottom and slide down the same top upwards, an intermittent conveyer situated underneath the said chute and adapted to remove during its active period the righted loaves gathered during its inactive period in a line side by side at the lower end of the said chute, a rocking grate having a platform composed of fingers and adapted to receive from the said intermittent conveyer the loaves allineated thereon, a swinging chute bridging the interstice between the said intermittent conveyer and the said rocking grate, a cooling conveyer, a chain conveyer so arranged between the latter and the said rocking grate that the loaves situated on the platform of the latter are rapidly transferred to the said cooling conveyer by the said chain conveyer, when the fingers of the said rocking grate dip down between the chains of the former, and guides arranged along each side of the surfaces on which the loaves pass.

GUSTAV BERNHARD EGGERT.